US009213104B2

(12) United States Patent
Ogawa et al.

(10) Patent No.: US 9,213,104 B2
(45) Date of Patent: Dec. 15, 2015

(54) POSITIONING SYSTEM AND METHOD (75) Inventors: Kazuhiro Ogawa, Tokyo (JP); Kenichi Takasu, Tokyo (JP); Shigeyuki Yamaguchi, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 2297 days.

(21) Appl. No.: 12/117,925

(22) Filed: May 9, 2008

(65) Prior Publication Data

US 2008/0281520 A1    Nov. 13, 2008

(30) Foreign Application Priority Data

May 10, 2007    (JP) .................................. 2007-125145

(51) Int. Cl.
  *G01C 21/00*  (2006.01)
  *G01S 19/43*  (2010.01)
  *G01S 5/00*   (2006.01)
  *G01S 3/02*   (2006.01)

(52) U.S. Cl.
  CPC ............... *G01S 19/43* (2013.01); *G01S 5/0036* (2013.01)

(58) Field of Classification Search
  CPC ....... G01S 19/05; G01S 19/09; G01S 19/235; G01S 19/25; G01S 19/32; G01S 19/48; G01S 5/0009; G01S 5/0252; G01S 5/0268; G01S 5/0278
  See application file for complete search history.

(56) References Cited

U.S. PATENT DOCUMENTS

| 5,734,348 | A | 3/1998 | Aoki et al. | |
|---|---|---|---|---|
| 6,078,285 | A | 6/2000 | Ito | |
| 6,198,989 | B1 | 3/2001 | Tankhilevich et al. | |
| 7,414,575 | B2 * | 8/2008 | Watanabe et al. | 342/357.37 |
| 8,135,413 | B2 * | 3/2012 | Dupray | 455/456.1 |
| 2001/0022558 | A1 * | 9/2001 | Karr et al. | 342/450 |
| 2003/0146871 | A1 * | 8/2003 | Karr et al. | 342/457 |
| 2004/0266457 | A1 * | 12/2004 | Dupray | 455/456.5 |

(Continued)

FOREIGN PATENT DOCUMENTS

JP    10-267656    10/1998

OTHER PUBLICATIONS

Processing Pseudoranges and Carrier Phases, Relative Positioning, pp. 259-277.

(Continued)

*Primary Examiner* — Ryan Zeender
*Assistant Examiner* — Dana Amsdell
(74) *Attorney, Agent, or Firm* — Dickstein Shapiro LLP (57) ABSTRACT

In a positioning system, an arithmetic processor analyzes positioning data acquired by a receiving terminal and determines a positioning target location. Upon reception of positioning data, the arithmetic processor accumulates the positioning data on analysis data stored in a storage section prior to the reception, stores an accumulated data as new analysis data, and transmits an analysis result to the receiving terminal. The receiving terminal transmits positioning data, acquired for a predetermined time, to the arithmetic processor and continues to acquire positioning data. Upon reception of the analysis result, the receiving terminal determines whether the analysis result is good or poor. When the analysis result is poor and the positioning data is stored for the predetermined time from a last transmission of the positioning data, the receiving terminal transmits the positioning data to the arithmetic processor and continues to acquire positioning data. If the analysis result is good, the receiving terminal completes positioning of the positioning target location.

9 Claims, 6 Drawing Sheets

(56) References Cited

U.S. PATENT DOCUMENTS

2005/0060089 A1* 3/2005 Garin et al. .................. 701/213
2005/0101248 A1 5/2005 Vollath
2008/0133126 A1* 6/2008 Dupray ........................ 701/204

OTHER PUBLICATIONS

Pseudorange and Carrier Phase Observables, pp. 170-187.

* cited by examiner

FIG.5

POSITIONING SYSTEM AND METHOD

CROSS REFERENCE TO RELATED APPLICATIONS

The present application is based on and claims priority from Japanese Patent Application Number 2007-125145, filed on May 10, 2007, the disclosure of which is hereby incorporated by reference herein its entirety.

BACKGROUND

The present invention relates to a positioning system using GNSS (Global Navigation Satellite System) and a receiving terminal for use therein.

It has been known that GPS (Global Positioning System) as one of GNSS is used for positioning. As its positioning method, known is a static method of determining a position of a location (a positioning target location) with GPS receivers, which are capable of receiving a radio signal from a GPS satellite, installed at both the positioning target location and a location used as a reference (reference location) in a fixed manner.

In the static method, positioning data extracted based on a radio signal received by each GPS receiver (hereinafter referred to as positioning data acquired from each GPS receiver) is analyzed, thereby allowing the position of the positioning target location to be correctly determined. However, since high arithmetic capability is required for the analysis, an arithmetic processor for analyzing each positioning data is large-scale and bringing the arithmetic processor to a positioning field is difficult. Accordingly, in the static method, each acquired positioning data is brought back from the positioning field and is analyzed by the arithmetic processor to determine the position of the positioning target location.

However, in the aforementioned method, whether the acquired positioning data is satisfactory enough to correctly determine the position of the positioning target location from an analysis result acquired by analyzing the acquired positioning data by the arithmetic processor. When the data is not satisfactory enough to correctly determine the position of the positioning target location (a case where the position of the positioning target location cannot be correctly calculated), an operator needs to return to the positioning field and reacquire the positioning data from the beginning using each GPS receiver.

For that reason, for example, Japanese Patent Application Publication No. H10-267656 discloses that one type of positioning system has been proposed in place of bringing back positioning data acquired by each GPS receiver. In this positioning system, the positioning data is transmitted to an arithmetic processor by a communication unit. In addition, the arithmetic processor that receives the positioning data analyzes the positioning data, is configured to determine whether a position of a positioning target location is correctly obtained from the positioning data, and to transmit a warning signal to the GPS receiver if the position of the positioning target location is not correctly obtained. In this configuration, the GPS receiver is also configured to issue a warning upon reception of the warning signal.

This positioning system allows the operator to find out whether positioning data is satisfactory enough to correctly determine the position of the positioning target location while staying at the positioning field after acquiring the positioning data using each GPS receiver. This enables the operator to save time which would be otherwise spent traveling back and forth between the positioning field and a location where the arithmetic processor is placed. This also enables the operator to acquire positioning data again at the same positioning target location using each GPS receiver when the position of the positioning target location is not correctly obtained, and to acquire positioning data at a different positioning target location using each GPS receiver when the position of the positioning target location is correctly obtained. As a whole, with this positioning system, speedy positioning work is possible.

However, in the aforementioned positioning system, when the position of the positioning target location is not correctly obtained from positioning data acquired by each GPS receiver, positioning data on the same positioning target location needs to be reacquired from the beginning using each GPS receiver. This duplicates positioning data acquisition work at the positioning target location and, as a whole, efficiency of positioning work will be lowered.

SUMMARY

An object of the present invention is to provide a positioning system capable of improving efficiency of positioning work.

A positioning system according to an embodiment of the present invention comprises: a receiving terminal having a storage section capable of storing positioning data acquired from a satellite for a predetermined time; an arithmetic processor capable of analyzing positioning data acquired from a satellite; and a communication unit enabling communication between the arithmetic processor and the receiving terminal, the positioning system being capable of positioning of a positioning target location by placing the receiving terminal at the positioning target location in a fixed manner, wherein the arithmetic processor comprises; a storage section that is capable of storing, as analysis data, the positioning data received from the receiving terminal; and an analyzing section that is capable of analyzing the analysis data stored in the storage section, the arithmetic processor, upon reception of the positioning data from the receiving terminal, accumulates the received positioning data on the analysis data stored in the storage section prior to the reception, stores the thus accumulated data as new analysis data, analyzes the new analysis data in the analyzing section and then transmits an analysis result to the receiving terminal, the receiving terminal comprises; a good-or-poor determining section that determines whether the analysis result received from the arithmetic processor is good or poor, the receiving terminal, once the positioning data is stored in the storage section for the predetermined time from an acquisition start time, transmits the positioning data to the arithmetic processor and continues to acquire the positioning data, and upon reception of the analysis result of the analysis data from the arithmetic processor, the receiving terminal determines whether the received analysis result is good or poor using the good-or-poor determining section, when the received analysis result is determined as poor and the positioning data is stored in the storage section for the predetermined time from a last transmission of the positioning data, the receiving terminal transmits the positioning data to the arithmetic processor and continues to acquire the positioning data, and when the received analysis result is determined as good, the receiving terminal completes the positioning of the positioning target location.

Preferably, when receiving no positioning data from the receiving terminal within a certain time period and receiving the positioning data from the receiving terminal thereafter, the arithmetic processor stores the positioning data as new analysis data in place of the analysis data stored in the storage section prior to the reception, analyzes the new analysis data in the analyzing section, and transmits the analysis result to the receiving terminal.

Preferably, the receiving terminal includes a movement detection section that is capable of detecting that a location of the receiving terminal itself is moved, when the movement detection section detects that the location of the receiving terminal itself is moved, the receiving terminal cancels the positioning of the positioning target location regardless of a determination result of the good-or-poor determining section.

Preferably, after an elapse of a certain time period from the time when the positioning of the positioning target location is started, the receiving terminal cancels the positioning of the positioning target location regardless of a determination result of the good-or-poor determining section.

A receiving terminal according to the embodiment of the present invention comprises the positioning system.

A positioning method according to the embodiment of the present invention comprises: preparing a receiving terminal having a storage section capable of storing positioning data acquired from a satellite for a predetermined time; preparing an arithmetic processor capable of analyzing positioning data acquired from a satellite; and preparing a communication unit enabling communication between the arithmetic processor and the receiving terminal, the positioning system being capable of positioning of a positioning target location by placing the receiving terminal at the positioning target location in a fixed manner, wherein the arithmetic processor comprises; a storage section that is capable of storing, as analysis data, the positioning data received from the receiving terminal; and an analyzing section that is capable of analyzing the analysis data stored in the storage section, the arithmetic processor, upon reception of the positioning data from the receiving terminal, accumulates the received positioning data on the analysis data stored in the storage section prior to the reception, stores the thus accumulated data as new analysis data, analyzes the new analysis data in the analyzing section and then transmits an analysis result to the receiving terminal, the receiving terminal comprises; a good-or-poor determining section that determines whether the analysis result received from the arithmetic processor is good or poor, the receiving terminal, once the positioning data is stored in the storage section for the predetermined time from an acquisition start time, transmits the positioning data to the arithmetic processor and continues to acquire the positioning data, and upon reception of the analysis result of the analysis data from the arithmetic processor, the receiving terminal determines whether the received analysis result is good or poor using the good-or-poor determining section, when the received analysis result is determined as poor and the positioning data is stored in the storage section for the predetermined time from a last transmission of the positioning data, the receiving terminal transmits the positioning data to the arithmetic processor and continues to acquire the positioning data, and when the received analysis result is determined as good, the receiving terminal completes the positioning of the positioning target location.

According to the positioning method, preferably, when receiving no positioning data from the receiving terminal within a certain time period and receiving the positioning data from the receiving terminal thereafter, the arithmetic processor stores the positioning data as new analysis data in place of the analysis data stored in the storage section prior to the reception, analyzes the new analysis data in the analyzing section, and transmits the analysis result to the receiving terminal.

According to the positioning method, preferably, the receiving terminal includes a movement detection section that is capable of detecting that a location of the receiving terminal itself is moved, when the movement detection section detects that the location of the receiving terminal itself is moved, the receiving terminal cancels the positioning of the positioning target location regardless of a determination result of the good-or-poor determining section.

According to the positioning method, preferably, after an elapse of a certain time period from the time when the positioning of the positioning target location is started, the receiving terminal cancels the positioning of the positioning target location regardless of a determination result of the good-or-poor determining section.

DETAILED DESCRIPTION OF THE PREFERRED EMBODIMENTS

The following will explain an embodiment of the present invention with reference to the drawings.

Figure 1:
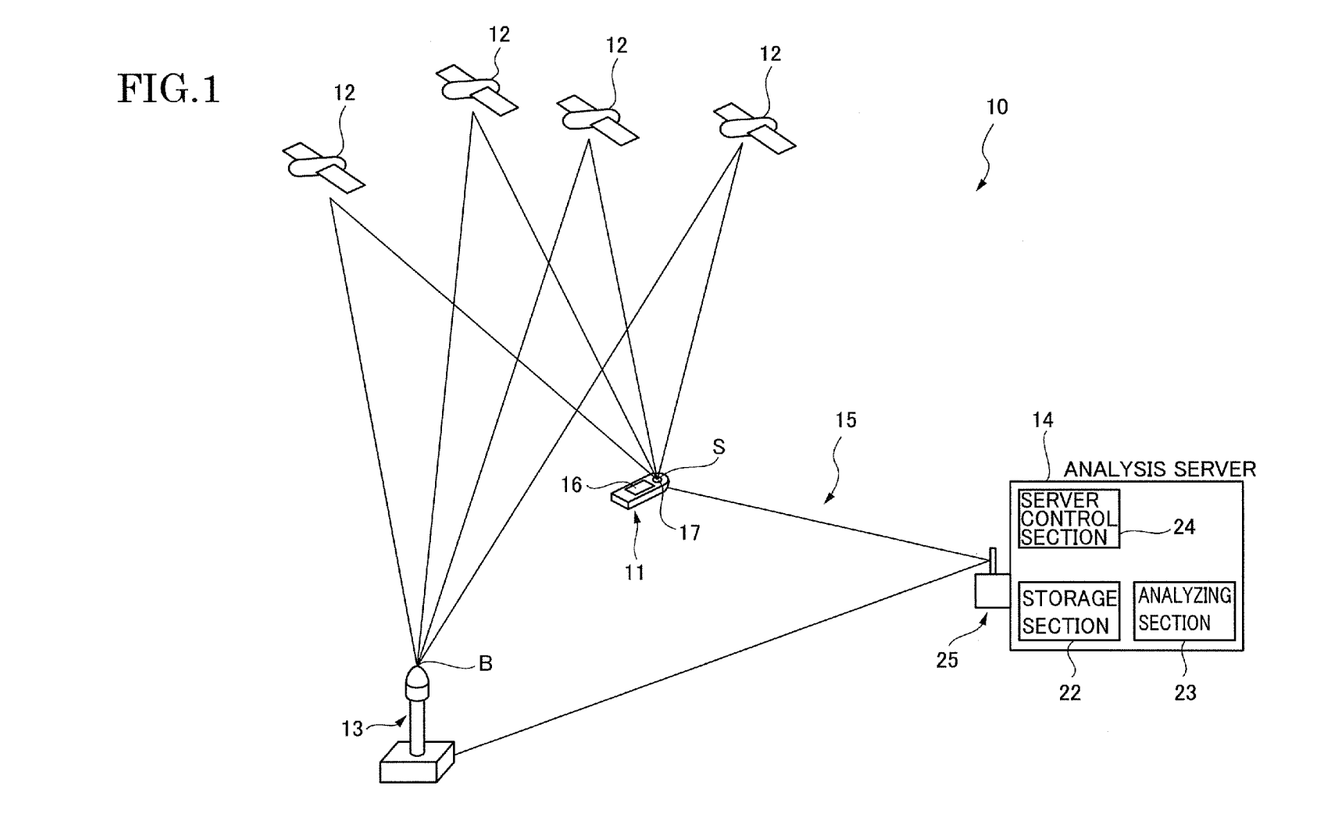
FIG. 1 is a configuration view explaining a positioning system according to an embodiment of the present invention.
Figure 2:
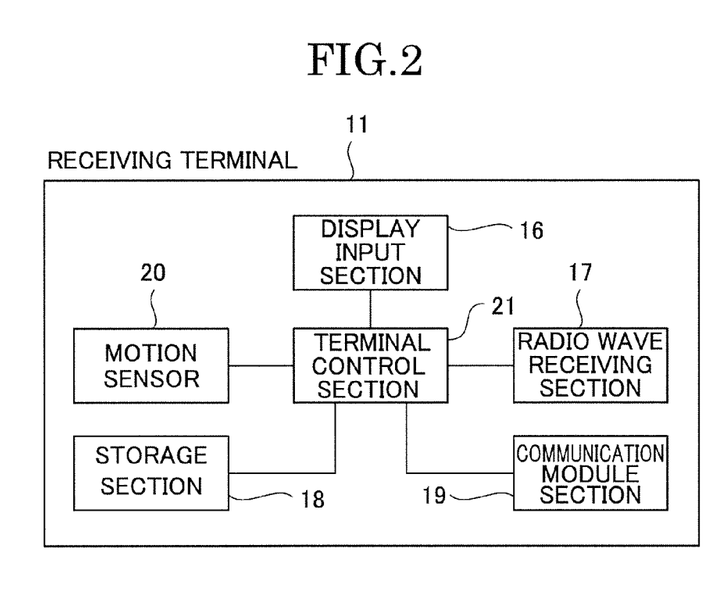
FIG. 2 is a configuration view illustrating a configuration of a receiving terminal of the positioning system.

FIG. 1 is a configuration view explaining a positioning system 10 according to the embodiment of the present invention, and FIG. 2 is a configuration view illustrating a configuration of a receiving terminal 11 of the positioning system 10.

The positioning system 10 determines a position of a positioning target location S by a static method using GNSS, and in this embodiment, as illustrated in FIG. 1, four GPS satellites 12 are employed to use GPS as one of GNSS. It should be noted that satellites to be employed are not limited to this embodiment, and may be, for example, a GLONASS satellite or the like if they are orbiting satellites for GNSS. In addition, the number of satellites to be employed is not limited to four and four or more satellites in a single system (for example, GPS only) are acceptable.

In the positioning system 10, the receiving terminal 11 is placed at a positioning target location S in a fixed manner to determine the position of the positioning target location S, and a reference station 13, an analysis server 14, and a communication unit 15 are used in addition to four GPS satellites 12.

The communication unit 15 enables communication between the analysis server 14 and the receiving terminal 11 and between the analysis server 14 and the reference station 13. As an example, transmission and reception using a communication antenna and those using IP (Internet Protocol) communication network or the like can be considered. In this embodiment, the communication unit 15 has a communication antenna 25 of the analysis server 14 to be described later, a communication module section 19 of the receiving terminal 11, and a reference station communication module section of the reference station 13, which is not illustrated. The communication unit 15 allows data exchange between the analysis server 14 and the receiving terminal 11 and between the analysis server 14 and the reference station 13.

Each GPS satellite 12 transmits a radio wave that carries data necessary for position determination. In order to acquire the radio wave (data), the receiving terminal 11 is used.

For example, in this embodiment, the receiving terminal 11 is a portable receiver capable of being carried, and includes a display input section 16, a radio wave receiving section 17, a storage section 18, a communication module section 19, a motion sensor 20 and a terminal control section 21.

The display input section 16 is a so-called touch panel (see FIG. 1) configured to allow an input operation by touching to be performed on a display screen for displaying an image thereon, and can perform selection of various types of functions of the receiving terminal 11, setting of various kinds of setting values (predetermined time ti, maximum positioning time tmax or the like to be described later) at the time of positioning.

The radio wave receiving section 17 receives radio waves from the orbiting satellites for GNSS (each GPS satellite 12 in this embodiment) to allow extraction of data (positioning data) carried thereon, the data necessary for positioning, and the positioning data which is extracted, is sent to the storage section 18. The storage section 18 appropriately stores positioning data received from the radio wave receiving section 17. The communication module section 19 is provided to transmit the positioning data stored in the storage section 18 to the analysis server 14. The communication module section 19 forms a part of the communication unit 15 and enables communication between the receiving terminal 11 and the analysis server 14. In addition, communication between the receiving terminal 11 and the analysis server 14 via the communication module section 19 is also configured to exchange account information for recognizing each other.

The motion sensor 20 determines whether the receiving terminal 11 is in stationary state or moving state. This is because positioning data to be analyzed needs to be obtained at a fixed positioning target location in the static method. In this embodiment, a tilt sensor, which is capable of detecting an inclination, is used as the motion sensor 20, and the presence or absence of a change in inclination with an elapse of a predetermined time is determined by the terminal control section 21 to thereby determine whether the receiving terminal 11 is in stationary state or moving state. In addition, the motion sensor 20 may be structured so as to analyze an image acquired by an imaging sensor, or an acceleration sensor, a gyro sensor, and the like can be used as the motion sensor 20. The terminal control section 21 integrally controls the operations of the aforementioned components.

Also, the terminal control section 21 determines an analysis result Ar, counts positioning time ts, sets the maximum positioning time tmax, counts data acquisition time tg, and sets predetermined time ti.

The analysis result Ar is a result obtained when the analysis server 14 analyzes positioning data for a positioning target location S to be described later. This includes a float solution where the number of wavelengths of radio waves is not obtained with an integer and a fix solution where the number of wavelengths of radio waves is obtained with an integer. The determination of the analysis result Ar indicates a determination whether the analysis result Ar is a float solution or fix solution. In the case of the fix solution, statistical indexes (standard deviation, data rejection rate, bias rejection rate, etc.) included therein are totally determined to decide whether quality is good or poor. In a case of the fix solution having a good quality, the analysis result Ar is determined as being good. Accordingly, in this embodiment, the terminal control section 21 also functions as a good-or-poor determining section. Additionally, when the terminal control section 21 determines that the analysis result Ar is good, position determining process of the receiving terminal 11 is completed, showing an operator that the analysis result Ar is good. The way how the receiving terminal 11 shows the operator that the analysis result Ar is good includes generating a notification sound, displaying a good analysis result Ar on the display input section 16, and the like.

The positioning time ts represents time passed after the start of position determination of an arbitrary positioning target location, namely, time passed after acquisition of positioning data is started at the receiving terminal 11 placed at the positioning target location in a fixed manner, and is used to manage the positioning time of the positioning target location. The positioning time ts is compared with the maximum positioning time tmax. The maximum positioning time tmax defines a time limit for determining a position of an arbitrary positioning target location, and can be arbitrarily set by operation of the display input section 16. When the maximum positioning time tmax is set so as to be considered generally sufficient time to correctly determine the position of the positioning target location, efficiency of positioning work can be improved. The reason is as follows. After a certain duration of time that is generally sufficient to correctly determine the position of the positioning target location is passed, there should be considered a possibility that some troubles (a case where good positioning data cannot be acquired from the satellites, a case where communication by the communication unit cannot be smoothly performed, or the like) have been caused. Accordingly, there is a possibility that, unless the troubles are removed, correct position determination cannot be achieved, and therefore there is a high possibility that cancellation of the positioning work will result in early achievement of correct position determination of the positioning target location.

The data acquisition time tg represents time passed after acquisition of positioning data is started at the receiving terminal 11 placed at the positioning target location in a fixed manner, and is used to manage the amount of acquired positioning data. The data acquisition time tg is compared with the predetermined time ti. The predetermined time ti defines the minimum amount of positioning data to be analyzed by the analysis server 14 in terms of a continuous time spent for data acquisition, and can be arbitrarily set by operation of the display input section 16. When the data acquisition time tg reaches the predetermined time ti, positioning data acquired by the receiving terminal 11 (stored in the storage section 18) corresponding to the predetermined time ti is named terminal positioning data Dt. The receiving terminal 11 sends the terminal positioning data Dt to the analysis server 14 requesting the analysis of terminal positioning data Dt.

In order to analyze the positioning data acquired by the receiving terminal 11 by the static method, positioning data acquired at a known location is required. In this embodiment, the reference station 13 is used to acquire positioning data at the known location.

As illustrated in FIG. 1, the reference station 13 receives a radio wave from the orbiting satellite for GNSS (each GPS satellite 12 in this embodiment) to thereby allow extraction of data (positioning data) carried thereon necessary for position determination, and acquires positioning data as required from all orbiting satellites for GNSS that, locationwise, the reference station 13 can receive the radio wave from, and stores the positioning data. The reference station 13 has the same communication module section, which is not illustrated, as that of the receiving terminal 11, and returns requested positioning data from among the positioning data already acquired and stored in response to a request from an outer section (in the positioning system 10, a request from the server control section 24 in the analysis server 14). The reference station 13 can be used by an unspecified number of persons, and therefore at the time of communication with the receiving terminal 11, account information of the receiving terminal 11 is confirmed thereby allowing communication with other receiving terminals and distinction between the receiving terminal 11 and the other receiving terminals. In order to analyze positioning data of a known point B (reference station 13) and that of the positioning target location S (receiving terminal 11), the analysis server 14 is used as an arithmetic processor.

The analysis server 14 includes a storage section 22, an analyzing section 23, and the server control section 24, and a communication antenna 25 that forms a part of the communication unit 15. The server control section 24 can communicate with the receiving terminal 11 or the reference station 13 via the communication antenna 25.

The storage section 22 appropriately stores analysis data Da to be described later. The analyzing section 23 is provided to analyze the positioning data stored in the storage section 22. The analyzing section 23 analyzes the positioning data stored in the storage section 22 and sends the analysis result Ar to the server control section 24. The server control section 24 integrally controls the operations of the analysis server 14. Also, the server control section 24 generates analysis data Da. This will be explained as follows:

Upon reception of terminal positioning data Dt together with the analysis request from the receiving terminal 11 via the communication antenna 25, the server control section 24 accumulates the terminal positioning data Dt on terminal analysis data Dat already stored in the storage section 22 to generate new terminal analysis data Dat, and stores the new terminal analysis data Dat in the storage section 22.

After that, the server control section 24 requests reference positioning data Db, which corresponds to the received terminal positioning data Dt, from the reference station 13. Here, the reference positioning data Db, which corresponds to the received terminal positioning data Dt, is positioning data that the reference station 13 acquires, that is, the positioning data from four GPS satellites which are used when the receiving terminal 11 acquires the terminal positioning data Dt, and the positioning data of the same time when the receiving terminal 11 acquires the terminal positioning data Dt. Upon reception of the requested reference positioning data Db from the reference station 13 via the communication antenna 25, the server control section 24 accumulates the reference positioning data Db on reference analysis data Dab already stored in the storage section 22 to generate new reference analysis data Dab, and stores the new reference analysis data Dab in the storage section 22.

After that, the server control section 24 controls the analyzing section 23 to analyze the terminal analysis data Dat and reference analysis data Dab stored in the storage section 22 as analysis data Da. Also, when determining that the positioning step has completed, the server control section 24 sets the analysis data Da (terminal analysis data Dat and reference analysis data Dab) stored in the storage section 22 to zero (initial state). It should be noted that setting of the analysis data Da to zero means that data quantity of analysis data Da, which is an original value for the new data to be accumulated, is set to zero in terms of the analysis process, and does not mean that the already received terminal positioning data Dt and reference positioning data Db are erased. In this embodiment, a reception interval Tr is used for judging completion of the positioning process.

The reception interval Tr represents time passed after the analysis server 14 transmits the analysis result Ar, and is used when the receiving terminal 11 determines whether the positioning process has completed. In this embodiment, the reception interval Tr is compared with the predetermined time ti. In this embodiment, when the reception interval Tr exceeds the predetermined time ti, the receiving terminal 11 determines that positioning is completed since previously transmitted analysis result Ar is a fix solution having a good quality. Therefore, the server control section 24 determines that no new terminal positioning data Dt is transmitted even when the reception interval Tr exceeds the predetermined time ti, and sets the analysis data Da stored in the storage section 22 to zero. In addition, as for determination of the completion of positioning process, no matter when a reference time is, the completion of positioning process may be determined when no new terminal positioning data Dt is transmitted even after a certain time passes. In addition to this, the completion may be determined when an end signal is received from the receiving terminal 11.

Figure 3:
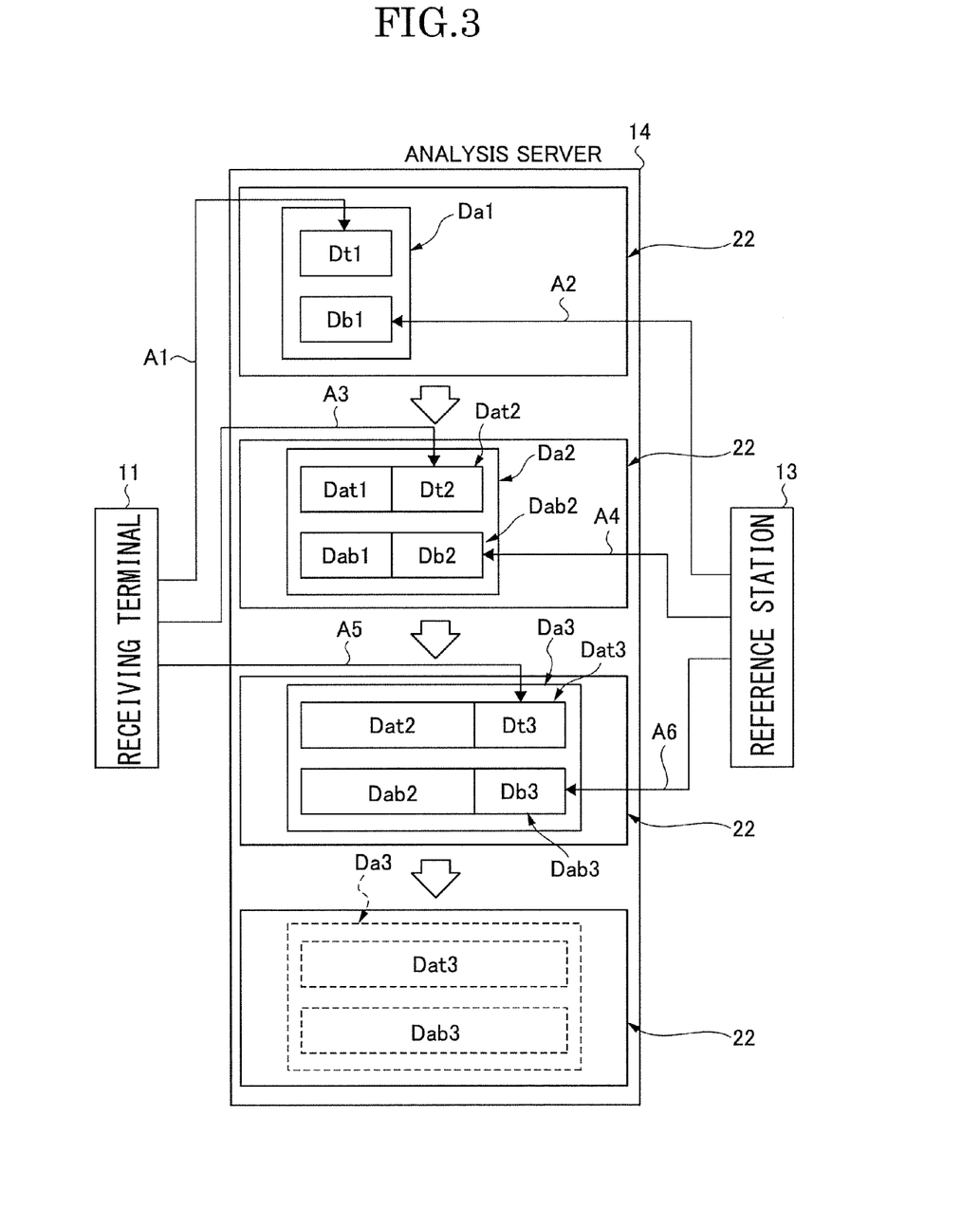
FIG. 3 is an explanatory view explaining a state in which analysis data is generated.

A process of generating analysis data Da in the analysis server 14 will be explained with reference to an example shown in FIG. 3. FIG. 3 is an explanatory view explaining how analysis data Da is generated, and four storage sections 22 in the analysis server 14 are illustrated from an upper part to a lower part in order to explain how analysis data Da is generated as time elapses. Here, in the analyzing section 23 placed at the uppermost part, the amount of data stored as analysis data Da is assumed to be zero.

First, upon reception of terminal positioning data Dt (hereinafter referred to as terminal positioning data Dt1) from the receiving terminal 11, the server control section 24 determines the terminal positioning data Dt1 as new terminal analysis data Dat1 since the terminal analysis Dat already stored in the storage section 22 is zero, and stores the new terminal analysis data Dat1 in the storage section 22 (see an arrow A1).

Next, the server control section 24 acquires reference positioning data Db1 corresponding to the terminal positioning data Dt1 from the reference station 13, determines the reference positioning data Db1 as new reference analysis data Dab1 since the reference analysis data Dab already stored in the storage section 22 is zero, and stores the new reference analysis data Dab1 in the storage section 22 (see an arrow A2).

The server control section 24 controls the analysis server 14 to analyze the terminal analysis data Dat1 and the reference analysis data Dab1 as analysis data Da1.

After that, upon reception of new terminal positioning data Dt (hereinafter referred to as terminal positioning data Dt2) from the receiving terminal 11, the server control section 24 accumulates the terminal positioning data Dt2 on the terminal analysis data Dat1 already stored in the storage section 22 to generate new terminal analysis data Dat2, and stores the new terminal analysis data Dat2 in the storage section 22 (see an arrow A3).

The server control section 24 acquires reference positioning data Db2 corresponding to the terminal positioning data Dt2 from the reference station 13, accumulates the reference positioning data Db2 on the reference analysis data Dab1 already stored in the storage section 22 to generate new reference analysis data Dab2, and stores the new reference positioning data Dab2 in the storage section 22 (see an arrow A4).

The server control section 24 controls the analysis server 14 to analyze the terminal analysis data Dat2 and reference analysis data Dab2 as analysis data Da2.

Moreover, upon reception of new terminal positioning data Dt (hereinafter referred to as terminal positioning data Dt3) from the receiving terminal 11, the server control section 24 accumulates the terminal positioning data Dt3 on the terminal analysis data Dat2 already stored in the storage section 22 to generate new terminal analysis data Dat3, and stores the new terminal analysis data Dat3 in the storage section 22 (see an arrow A5).

The server control section 24 acquires reference positioning data Db3 corresponding to the terminal positioning data Dt3 from the reference station 13, accumulates the reference positioning data Db3 on the reference analysis data Dab2 already stored in the storage section 22 to generate new reference analysis data Dab3, and stores it in the storage section 22 (see an arrow A6).

The server control section 24 controls the analysis server 14 to analyze the terminal analysis data Dat3 and reference analysis data Dab3 as analysis data Da3.

After that, the server control section 24 determines that the positioning process has completed in the receiving terminal 11. In this case, the server control 24 determines the analysis data Da3 (terminal analysis data Dat3 and reference analysis data Dab3) already stored in the storage section 22 as analysis data Da whose data quantity is zero.

Figure 4:
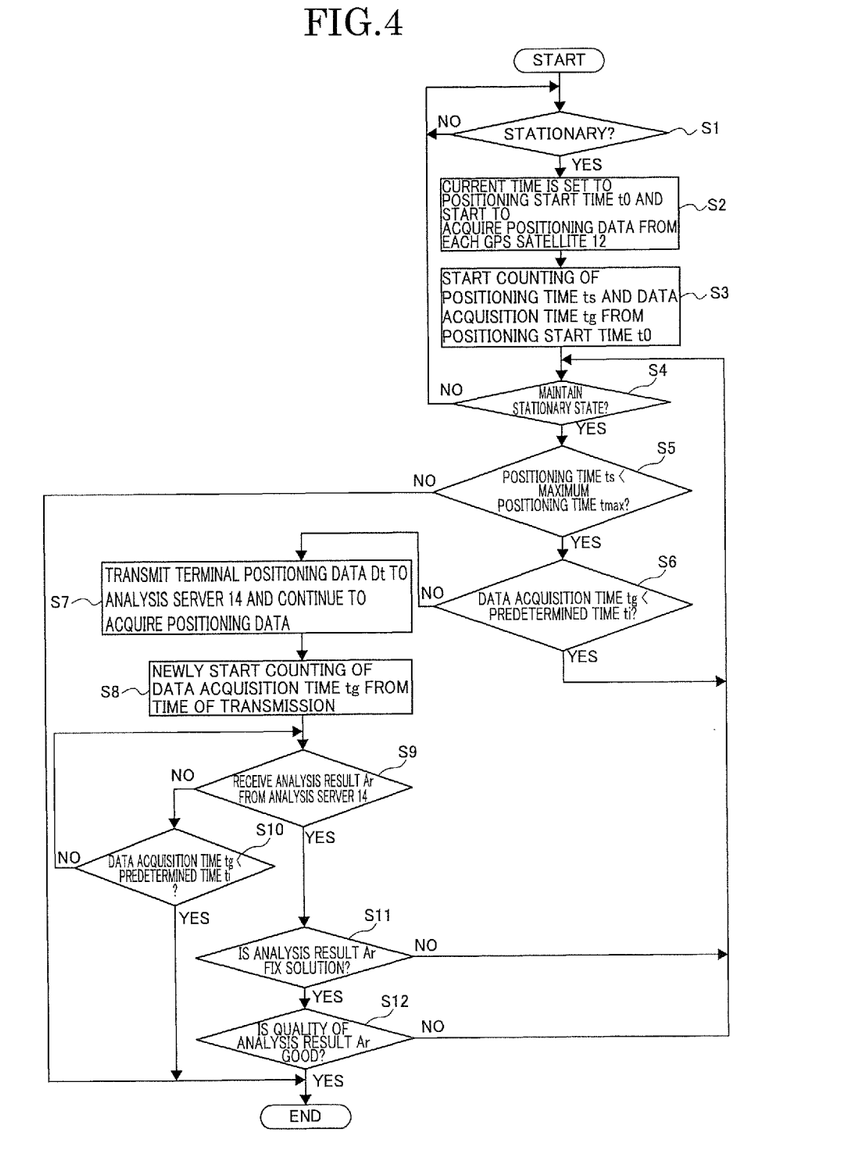
FIG. 4 is a flowchart illustrating a position determination process in the receiving terminal.
Figure 5:
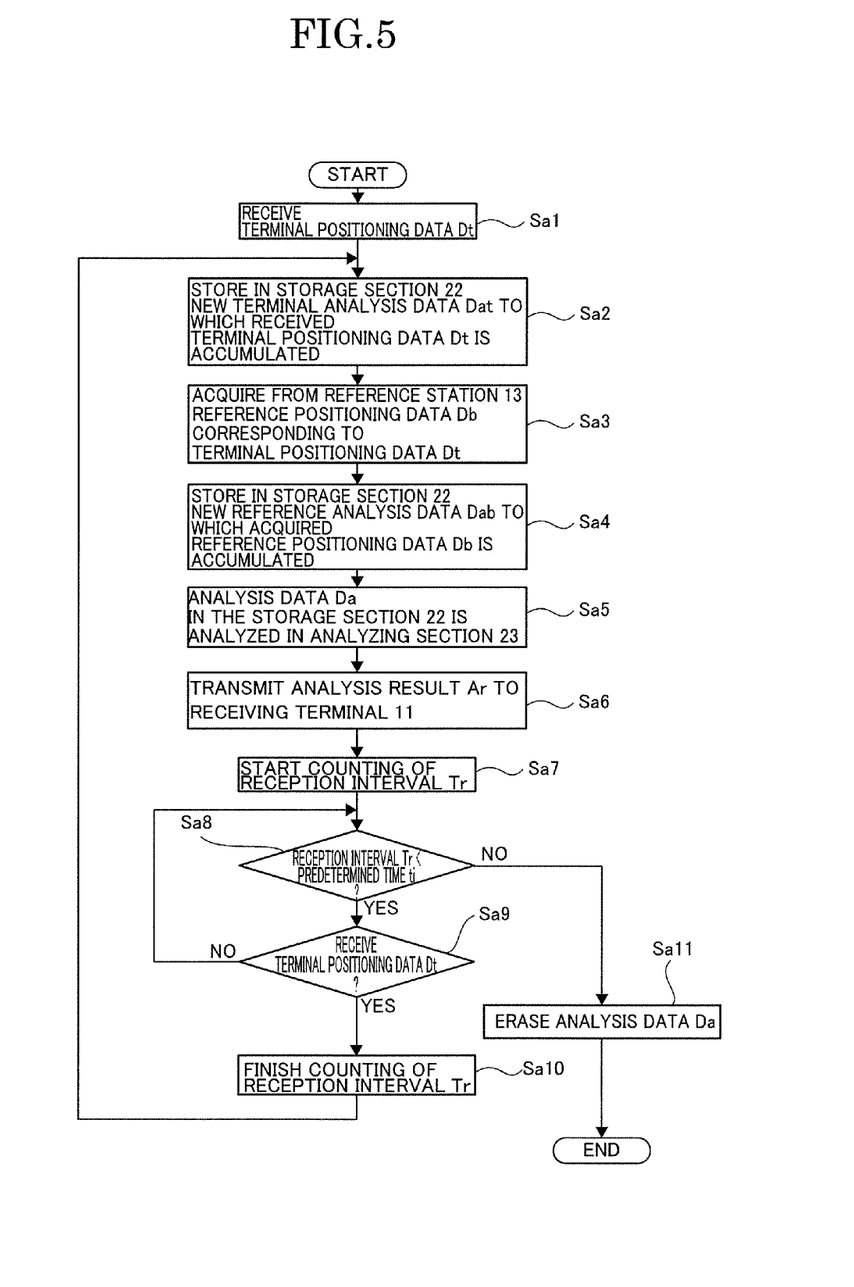
FIG. 5 is a flowchart illustrating an analyzing process in an analysis server.

The following will explain the processes in positioning by the static method in the receiving terminal 11 and the analysis server 14 of the positioning system 10 with reference to flowcharts illustrated in FIGS. 4 and 5. Here, FIG. 4 is a flowchart illustrating the positioning process in the receiving terminal 11 and FIG. 5 is a flowchart illustrating the analyzing process in the analysis server 14.

First, as illustrated in FIG. 1, the operator places the receiving terminal 11 at an arbitrary positioning target location S in a fixed manner to determine the position of the positioning target location S and operates the display input section 16 to perform positioning. In this embodiment, for example, the receiving terminal 11 may be carried by the operator since it is the portable and small size terminal. However, since the receiving terminal 11 needs to be fixed at a certain location until positioning is completed, the receiving terminal 11 is preferably placed in a fixed manner by a tripod or the like, which is not illustrated. Here, the receiving terminal 11 acquires positioning data from four GPS satellites 12 to position the positioning target location S. The following will explain the positioning process in the receiving terminal 11 thus placed with reference to the flowchart in FIG. 4.

The terminal control section 21 determines whether the receiving terminal 11 is stationary based on a detection signal from the motion sensor 20 (step S1). When it is stationary, the process goes to step S2, and when it is not stationary, step S1 is repeated until it is stationary.

When the receiving terminal 11 is stationary, the terminal control section 21 determines current time as positioning start time t0 (see FIG. 6) and starts acquisition of positioning data from each GPS satellite 12 (step S2).

The terminal control section 21 starts counting of positioning time ts and data acquisition time tg from positioning start time t0 (step S3).

The terminal control section 21 determines whether a stationary state of the receiving terminal 11 is maintained based on the detection signal from the motion sensor 20 (step S4). When the stationary state of the receiving terminal 11 is maintained, the process goes to step S5, and when it is not maintained, the process goes back to step S1, that is, positioning is restarted from the beginning.

The terminal control section 21 determines whether the positioning time ts is below the maximum positioning time tmax (step S5). When the positioning time ts is below the maximum positioning time tmax, the process goes to step S6, and when it is not below the maximum positioning time tmax, the terminal control section 21 cancels positioning of the positioning target location S. At the time of cancellation, preferably the display input section 16 can indicate that positioning time ts exceeds the maximum positioning time tmax.

The terminal control section 21 determines whether the data acquisition time tg is below the predetermined time ti (step S6). When the data acquisition time tg is below the predetermined time ti, the process goes back to the step S4, and when it is not below the predetermined time ti, namely, the data acquisition time tg reaches the predetermined time ti, the process goes to step S7.

When the data acquisition time tg reaches the predetermined time ti, namely, positioning data stored in the storage section 18 of the receiving terminal 11 corresponds to the predetermined time ti, the terminal control section 21 transmits terminal positioning data Dt, which is positioning data for the predetermined time ti, to the analysis server 14 via the communication module section 19, and continues to acquire positioning data from each GPS satellite 12 (step S7).

The terminal control section 21 newly starts counting of data acquisition time tg from the time when the terminal positioning data Dt is transmitted to the analysis server 14 (step S8).

The terminal control section 21 determines whether the communication module section 19 has received an analysis result Ar from the analysis server 14 (step S9). When the communication module section 19 has not received the analysis result Ar, the process goes to step S10, and when it has received the analysis result Ar, the process goes to step S1.

When the communication module section 19 has not received the analysis result Ar, the terminal control section 21 determines whether the data acquisition time tg is below the predetermined time ti (step S10). When the data acquisition time tg is below the predetermined time ti, the process goes back to step S9, and when it is not below the predetermined time ti, the terminal control section 21 cancels positioning of the positioning target location S. In the case where the analysis result Ar has not been received even when the data acquisition time tg exceeds the predetermined time ti, there is a possibility that some troubles may have been caused in data exchange via the communication unit 15 or the process in the analysis server 14. Accordingly, there is a possibility that, unless the troubles are removed, correct positioning may not be achieved, and therefore there is a high possibility that cancellation of the positioning work will result in early achievement of correct positioning of the positioning target location.

When the communication module section 19 has received the analysis result Ar, the terminal control section 21 determines whether the analysis result Ar is a fix solution (step S11). When the analysis result Ar is the fix solution, the process goes to step S12, and when it is not the fix solution, the process goes back to step S4 to continue the positioning process. At this time, the analysis result Ar may be displayed on the display input section 16.

When the analysis result Ar is the fix solution, the terminal control section 21 determines whether quality of the analysis result Ar, which is the fix solution, is good (step S12). When the quality is poor, the process goes back to step S4 to continue the positioning process, and when it is good, the positioning process is completed since the position of the positioning target location S can be correctly determined.

The receiving terminal 11 performs the aforementioned positioning process. However, in step S9, unless the receiving terminal 11 receives the analysis result Ar, which is based on the terminal positioning data Dt transmitted in step S7, the receiving terminal 11 cannot determine the position of the positioning target location S. The following will explain an analyzing process in the analysis server 14 that transmits the analysis result Ar based on the terminal positioning data Dt with reference to the flowchart illustrated in FIG. 5.

Upon reception of terminal positioning data Dt transmitted from the receiving terminal 11, the server control section 24 starts the following analyzing process (step Sa1). Here, a configuration may be provided such that a signal representing a start of positioning is included in terminal positioning data Dt that is first transmitted after the start of positioning, and a configuration may be provided such that analysis data Da stored in the storage section 22 is set to zero upon reception of the terminal positioning data Dt including the signal representing the start of positioning. These configurations surely prevent an erroneous process such as accumulation of positioning data, which is irrelevant to the analyzing process started at a current time, to analysis data Da.

The server control section 24 accumulates the received terminal positioning data Dt on the terminal analysis data Dat already stored in the storage section 22 to generate new terminal analysis data Dat, and stores the new terminal analysis data Dat in the storage section 22 (step Sa2).

The server control section 24 requests reference positioning data Db corresponding to the received terminal positioning data Dt from the reference station 13 (see symbol rq shown in FIG. 6) and acquires the reference positioning data Db from the reference station 13 (step Sa3).

The server control section 24 accumulates the received reference positioning data Db on reference analysis data Dab already stored in the storage section 22 to generate new reference analysis data Dab, and stores the new reference analysis data Dab in the storage section 22 (step Sa4).

The server control section 24 controls the analyzing section 23 to analyze the analysis data Da (terminal analysis data Dat and reference analysis data Dab) stored in the storage section 22 (step Sa5).

The server control section 24 transmits an analysis result Ar acquired by analyzing the analysis data Da to the receiving terminal 11 via the communication module section 19 (step Sa6).

The server control section 24 starts counting of a reception interval Tr from the time when the analysis result Ar is transmitted (step Sa7).

The server control section 24 determines whether the reception interval Tr is below predetermined time ti (step Sa8). When the reception interval Tr is below the predetermined time ti, the process goes to step S9, and when it is not below the predetermined time ti, the process goes to step S11.

When the reception interval Tr is below the predetermined time ti, the server control section 24 determines whether new terminal positioning data Da has been received after transmitting the analysis result Ar (step Sa9). When it has been received, the process goes to step Sa10, and when it has not been received, the process goes back to step Sa8.

The server control section 24 ends counting of the reception interval Tr and goes back to step Sa2 to analyze analysis data to which new positioning data is accumulated (step Sa10).

Also, when determining that the reception interval Tr is not below the predetermined time ti in step Sa8, the server control section 24 determines that the receiving terminal 11 has completed the positioning process since no new terminal positioning data Dt is received even when the reception interval Tr exceeds the predetermined time ti. Then, the server control section 24 sets the analysis data Da stored in the storage section 22 to zero and completes the analyzing process (step Sa11).

Figure 6:
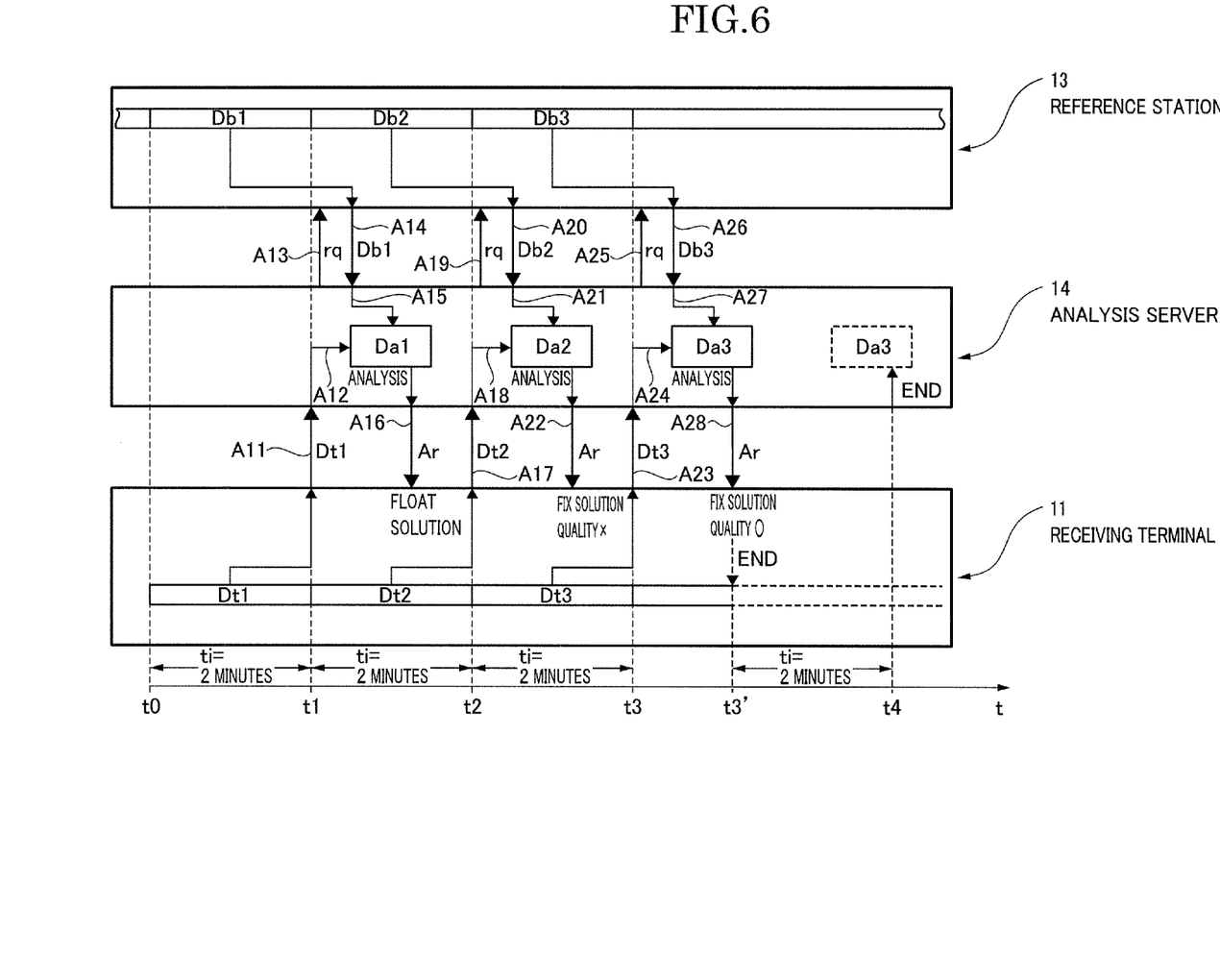
FIG. 6 is an explanatory view explaining operations of the receiving terminal, the analysis server, and a reference station and data exchange thereamong.

The following will explain an example of the positioning process by the static method in the positioning system 10 using FIG. 6. FIG. 6 is an explanatory view explaining operations of the receiving terminal 11, the analysis server 14 and the reference station 13 and data exchange among these, and schematically illustrates the operations of these sections and data exchange along a time axis illustrated in the lower part. It should be noted that, in FIG. 6, there is no description including time required for data communication to make understanding easy, and therefore this drawing does not perfectly correspond to actual operations.

In this example, the receiving terminal 11 placed at the positioning target location S (see FIG. 1) is stationary and no operation for completing the positioning is performed onto the display input section 16 until positioning is completed. Also, in this example, the predetermined time ti is set to two minutes and the maximum positioning time tmax is set to ten minutes.

At time t1 after the predetermined time ti (two minutes) has passed since the positioning start time t0, terminal positioning data Dt1 is transmitted from the receiving terminal 11 (see an arrow A11). The terminal positioning data Dt1 is positioning data stored in the storage section 18 after being acquired in the receiving terminal 11 between the positioning start time t0 and the time t1.

The analysis server 14, which has received terminal positioning data Dt1, stores the terminal positioning data Dt1, as analysis data Da1 (terminal analysis data Dat1 (see FIG. 3)), in the storage section 22 (see an arrow A12), and requests reference positioning data Db1, which corresponds to the terminal positioning data Dt1, from the reference station 13 (see an arrow A13).

The reference station 13 transmits the reference positioning data Db1 to the analysis server 14 as requested (see an arrow A14).

In the analysis server 14, in which the reference positioning data Db1 has been received, the reference positioning data Db1 as analysis data Da1 (reference analysis data Dab1 (see FIG. 3)) is stored in the storage section 22 (see an arrow A15), and then the analysis data Da1 stored in the storage section 22 is analyzed in the analyzing section 23. The analysis server 14 transmits this analysis result Ar to the receiving terminal 11 (see an arrow A16).

Upon reception of the analysis result Ar, the receiving terminal 11 determines whether the analysis result Ar is good or poor. Here, it is assumed that the analysis result Ar at this time is a float solution. When determining that the analysis result Ar is poor and at time t2 after the predetermined time ti (two minutes) has passed since positioning start time t1 (see an arrow A17), the receiving terminal 11 transmits terminal positioning data Dt2 to the analysis server 14.

The analysis server 14, which has received terminal positioning data Dt2, stores the terminal positioning data Dt2, as analysis data Da2 (terminal analysis data Dat2 (see FIG. 3)), in the storage section 22 (see an arrow A18), and requests reference positioning data Db2, which corresponds to the terminal positioning data Dt2, from the reference station 13 (see an arrow A19).

The reference station 13 transmits the reference positioning data Db2 to the analysis server 14 as requested (see an arrow A20).

In the analysis server 14, in which the reference positioning data Db2 has been received, the reference positioning data Db2 as analysis data Da2 (reference analysis data Dab2 (see FIG. 3)) is stored in the storage section 22 (see an arrow A21), and then the analysis data Da2 stored in the storage section 22 is analyzed in the analyzing section 23. The analysis server 14 transmits this analysis result Ar to the receiving terminal 11 (see an arrow A22).

Upon reception of the analysis result Ar, the receiving terminal 11 determines whether the analysis result Ar is good or poor. Here, it is assumed that the analysis result Ar at this time is a fix solution but is poor in quality. When determining that the analysis result Ar is poor, the receiving terminal 11 transmits terminal positioning data Dt3 to the analysis server 14 at time t3 after the predetermined time ti (two minutes) has passed since time t2 (see an arrow A23).

The analysis server 14, which has received terminal positioning data Dt3, stores the terminal positioning data Dt3, as analysis data Da3 (terminal analysis data Dat3 (see FIG. 3)), in the storage section 22 (see an arrow A24), and requests reference positioning data Db3, which corresponds to the terminal positioning data Dt3, from the reference station 13 (see an arrow A25).

The reference station 13 transmits the reference positioning data Db3 to the analysis server 14 as required (see an arrow A26).

In the analysis server 14, in which the reference positioning data Db3 has been received, the reference positioning data Db3 as analysis data Da3 (reference analysis data Dab3 (see FIG. 3)) is stored in the storage section 22 (see an arrow A27), and then the analysis data Da3 stored in the storage section 22 is analyzed in the analyzing section 23. The analysis server 14 transmits this analysis result Ar to the receiving terminal 11 (see an arrow A28).

Upon reception of the analysis result Ar, the receiving terminal 11 determines whether the analysis result Ar is good or poor. Here, it is assumed that the analysis result Ar at this time is a fix solution and is good in quality. The receiving terminal 11 determines that the analysis result Ar is good and completes the positioning process (positioning data acquired at time t3 is discarded). This enables a receiving terminal 11 side (an operator who uses this) to acquire a correct positioning result of the positioning target location S (see FIG. 1).

After that, the analysis server 14 determines that the receiving terminal 11 has completed the positioning process since no new terminal positioning data Dt is transmitted from the receiving terminal 11 even at time t4 after the predetermined time ti (two minutes) has passed since time t3 when the analysis result Ar was transmitted to the receiving terminal 11. Therefore, the analysis server 14 determines the analysis data Da3 stored in the analysis server 14 as analysis data Da whose data quantity is zero and completes the analyzing process.

Additionally, in the aforementioned positioning, the positioning is completed within ten minutes, which is the maximum positioning time tmax after counting from the positioning start time t0, and therefore the positioning is not forcibly cancelled in the course of positioning work.

At every elapse of the predetermined time ti that can be arbitrarily set, the positioning system 10 according to the embodiment of the present invention analyzes positioning data acquired during the time between the positioning start time t0 and a current time, and completes the position determining process at the time when the analysis result Ar which is good is acquired. This positioning system can efficiently perform the correct positioning as compared with the positioning system that performs positioning by a conventional static method. The reason is as follows. In a case where positioning is performed by the static method, an amount of positioning data required for good positioning varies depending on a condition of the orbiting satellites for GNSS in acquiring positioning data, environment of the positioning target location in acquiring positioning data, etc. in view of continuous acquisition time. For example, a sufficient amount of data may be acquired in several minutes or may be acquired in more than one hour. Accordingly, in a conventional positioning system, in consideration of variations of necessary time, for example, positioning data acquired continuously for 60 minutes was analyzed. However, in the method as described above, a situation arises in which positioning data more than necessary is acquired depending on a length of necessary time. In other words, the maximum value of time for which positioning data is acquired more than necessary can be set to predetermined time ti or less, and therefore it is possible to perform correct positioning efficiently.

Moreover, in the positioning system 10, taking an example shown in FIG. 6, for instance, even in a case where a good analysis result Ar cannot be acquired using analysis data Da2 (case where the position of the positioning target location S cannot be correctly determined), analysis data Da3 to be analyzed after an elapse of next predetermined time ti is generated by accumulating terminal positioning data Dt3 and reference positioning data Db3 between time t2 and time t3 on the analysis data Da2, respectively. Therefore, it is possible to prevent duplication of acquisition work of positioning data at the positioning target location S (acquisition work during the time period from time to time t2) and improve efficiency of positioning work.

Furthermore, in the positioning system 10, acquisition work of positioning data in the receiving terminal 11, work for generating an analysis result Ar based on the terminal positioning data Dt in the analysis server 14, and work for transmitting the analysis result Ar to the receiving terminal 11 from the analysis server 14 are performed simultaneously and in parallel from the time when the receiving terminal 11 transmits terminal positioning data Dt. Therefore, efficiency of positioning work is improved.

Additionally, in the positioning system 10, when the position of the positioning target location S can be correctly determined using the already transmitted terminal positioning data Dt, the operator, who uses the receiving terminal 11, can immediately recognize acquisition of a fix solution having a good quality, and therefore, efficiency of positioning work is improved.

In the positioning system 10, the analysis server 14 determines that the receiving terminal 11 itself has completed the positioning process and ends the analyzing process appropriately, and therefore it is possible to start positioning of a new positioning target location without any signal being transmitted from the receiving terminal 11.

In the positioning system 10, the receiving terminal 11 itself determines whether the receiving terminal 11 is stationary, and performs positioning process only when it is stationary. Therefore, it is possible to prevent erroneous position determination, such as the receiving terminal 11 that is mistakenly moved upon operation of the display input section 16, where positioning data is acquired in an incorrect state. Thus, the position of the positioning target location S can be efficiently and correctly determined.

In the positioning system 10, when positioning time exceeds maximum positioning time tmax, positioning is cancelled, and therefore if the maximum positioning time tmax is set to time which is generally sufficient to correctly determine the position of the positioning target location, efficiency of positioning work is improved.

In the positioning system 10, a configuration is provided in which positioning data to be acquired may not be duplicated in the receiving terminal 11, and therefore it is possible to control the amount of positioning data to be transmitted to the analysis server 14 from the receiving terminal 11.

By use of the receiving terminal 11 capable of configuring the positioning system 10, the operator operates the display input section 16 to place the receiving terminal 11 at a desired positioning target location S in a fixed manner, thereby allowing the position of the positioning target location S to be efficiently determined.

Accordingly, the positioning system 10 according to the embodiment of the present invention can improve efficiency of positioning work.

The analysis server 14 may be configured to receive positioning data Dt from the receiving terminal 11, to accumulate the received positioning data Dt on analysis data Da stored in the storage section 22 prior to the reception of the positioning data Dt to store it as new analysis data Da therein, to control the analyzing section 23 to analyze the new analysis data Da, and to transmit the analysis result Ar to the receiving terminal 11. Thus, the analysis server 14 is not limited to the aforementioned embodiment.

Moreover, the receiving terminal 11 may be configured as follows. When the positioning data stored in the storage section 18 from acquisition start time t0 corresponds to predetermined time ti, the receiving terminal 11 transmits the positioning data to the analysis server 14 and continues to acquire positioning data. Upon reception of analysis result Ar of the analysis data Da from the analysis server 14, the receiving terminal 11 determines whether the analysis result Ar is good or poor using a good-or-poor determining section (terminal control section 21 in the aforementioned embodiment). When the analysis result Ar is poor and the positioning data stored in the storage section 18 from the time when the positioning data is finally transmitted corresponds to the predetermined time ti, the receiving terminal 11 transmits the positioning data to the analysis server 14 and continues to acquire positioning data. When the analysis result Ar is good, the receiving terminal 11 completes the positioning of the positioning target location. Thus, the receiving terminal 11 is not limited to the aforementioned embodiment.

Furthermore, in the aforementioned embodiment, the reference station 13 is used to acquire positioning data at a known location. However, for example, the other receiving terminal may be placed at the known location in a fixed manner. Thus, the reference station 13 is not limited to the aforementioned embodiment.

According to the positioning system of the present invention, for example, even when a position of a positioning target location cannot be correctly determined using positioning data received by the receiving terminal at a previous time, positioning data at this time subsequent to the previous positioning data is accumulated on the previous positioning data to generate new analysis data, and the new analysis data is analyzed to determine the position of the positioning target location. Therefore, it is possible to prevent duplication of positioning data acquisition work at the positioning target location and to improve efficiency of positioning work.

Moreover, the previous positioning data is transmitted and acquisition of positioning data is continued and the positioning data, which is made to correspond to predetermined time by this continuation, results in the positioning data to be transmitted at this time. Therefore, by use of communication time between the receiving terminal and the arithmetic processor and analysis time at the arithmetic processor, it is possible to acquire positioning data that is supposed to accumulate on the already accumulated data in the case of incorrect positioning of the positioning target location, and to improve efficiency of positioning work.

Furthermore, when the position of the positioning target location can be correctly determined using the already transmitted positioning data, an operator, who uses the receiving terminal, can recognize that the position of the positioning target location can be correctly determined by reviewing the analysis result transmitted from the arithmetic processor, and thus efficiency of positioning work is improved.

In addition to the aforementioned configuration, when receiving no positioning data from the receiving terminal within a certain time period and receiving the positioning data from the receiving terminal thereafter, the arithmetic processor stores the positioning data as new analysis data in place of the analysis data stored in the storage section prior to the reception, controls the analyzing section to analyze the new analysis data, and transmits the analysis result to the receiving terminal. As a result, the position of the positioning target location can be correctly determined, and therefore, for example, even when a position of a new positioning target location is intended to be determined, the receiving terminal is merely placed at the new positioning target location, thereby enabling to start determining the position of the new positioning target location without any signal being transmitted from the receiving terminal side. The reason is as follows. In a case where the positioning target location is changed, certain duration of time is needed to place the receiving terminal at the new positioning target location. However, in a case where position determination is continued, time needed before new positioning data is received from the receiving terminal is shorter than the time for placing the receiving terminal at the new positioning target location. Therefore, by use of this time difference, it is possible to determine that the positioning target location has been changed.

In addition to the aforementioned configuration, the receiving terminal includes a movement detection section that is capable of detecting that a location of the receiving terminal itself is moved, and when the location of the receiving terminal itself is detected by the movement detection section, the receiving terminal cancels positioning of the positioning target location regardless of determination of the good-or-poor determining section. As a result, it is possible to determine the position of the positioning target location more efficiently and correctly. The reason is as follows. In the static method, positioning data to be analyzed needs to be data acquired at a fixed positioning target location. However, when position determination is continued without noticing movement of the location of data acquisition, a single positioning target location is analyzed based on positioning data acquired at different plurality of locations. This increases time taken before a good analysis result is acquired and leads to an incorrect analysis result.

In addition to the aforementioned configuration, after an elapse of a certain time period from the time when positioning of the positioning target location is started, the receiving terminal cancels positioning of the positioning target location regardless of determination of the good-or-poor determining section. As a result, sufficient time, which is required to determine the position of the positioning target location correctly, is set to a certain time, thereby allowing improvement in efficiency of positioning work. The reason is as follows. In a case of the elapse of the certain time from the time when positioning is started, it should be considered that some troubles (a case where good positioning data cannot be acquired from the satellites, a case where communication by the communication unit cannot be smoothly performed, or the like) have been caused. Accordingly, there is a possibility that, unless the troubles are removed, correct position determination may not be achieved, and therefore there is a high possibility that cancellation of positioning work will result in early achievement of correct positioning of the positioning target location.

By use of the receiving terminal that is capable of configuring the above-configured positioning system, the operator merely places the receiving terminal at a desired positioning target location in a fixed manner, thereby making it possible to determine the position of the positioning target location efficiently.

Although the present invention has been described in terms of exemplary embodiments, it is not limited hereto. It should be appreciated that variations may be made in the embodiments described by persons skilled in the art without departing from the scope of the present invention as defined by the following claims.

What is claimed is:

1. A positioning system comprising:
    a receiving terminal for acquiring terminal positioning data from a satellite, the receiving terminal being placed in a fixed manner at a positioning target location determined by a positioning process;
    a reference station for acquiring reference positioning data corresponding to the terminal positioning data from a satellite; and
    an arithmetic processor for receiving and analyzing the terminal positioning data and the reference positioning data corresponding to the terminal positioning data,
    wherein the arithmetic processor includes: a storage section for storing the terminal positioning data and the reference positioning data as analysis data; and an analyzing section for analyzing the analysis data,
    wherein upon receiving the terminal positioning data and the reference positioning data, the arithmetic processor accumulates the received terminal positioning data and the received reference positioning data on the analysis data previously stored in the storage section, stores the accumulated data as new analysis data, analyzes the new analysis data in the analyzing section and then transmits an analysis result to the receiving terminal, and
    wherein the receiving terminal placed in the fixed manner at the positioning target location determined by the positioning process includes: a storage section for storing the terminal positioning data acquired from the satellite for a predetermined time; and a good-or-poor determining section that determines whether the analysis result received from the arithmetic processor is good or poor, and
    wherein once the terminal positioning data is stored in the storage section for the predetermined time from an acquisition start time, the receiving terminal transmits the terminal positioning data to the arithmetic processor and continues to acquire the terminal positioning data, and upon transmission of the analysis result from the arithmetic processor, the receiving terminal determines whether the transmitted analysis result is good or poor using the good-or-poor determining section, and when the transmitted analysis result is determined as poor and the terminal positioning data is stored in the storage section for the predetermined time from a last transmission of the terminal positioning data, the receiving terminal transmits the terminal positioning data to the arithmetic processor and continues to acquire the terminal positioning data, and when the transmitted analysis result is determined as good, the receiving terminal completes the positioning process of the positioning target location.

2. The positioning system according to claim 1, wherein when receiving no terminal positioning data from the receiving terminal within a certain time period and receiving the terminal positioning data from the receiving terminal thereafter, the arithmetic processor stores the terminal positioning data and the reference positioning data as new analysis data in place of the analysis data previously stored in the storage section, analyzes the new analysis data in the analyzing section, and transmits the analysis result to the receiving terminal.

3. The positioning system according to claim 1, wherein the receiving terminal includes a movement detection section for detecting whether a location of the receiving terminal is moved, and when the movement detection section detects that the location of the receiving terminal is moved, the receiving terminal cancels the positioning process of the positioning target location regardless of a determination result of the good-or-poor determining section.

4. The positioning system according to claim 1, wherein after an elapse of a certain time period from the time when the positioning process of the positioning target location is started, the receiving terminal cancels the positioning process of the positioning target location regardless of a determination result of the good-or-poor determining section.

5. A positioning method for determining a positioning target location by continuously acquiring terminal positioning data for a predetermined time period at the positioning target location, the positioning method comprising:
    acquiring terminal positioning data and reference positioning data corresponding to the terminal positioning data for the predetermined time period from a satellite at the positioning target location;
    transmitting the terminal positioning data and the reference positioning data to an arithmetic processor;
    upon receiving the terminal positioning data and the reference positioning data by the arithmetic processor, accumulating the received terminal positioning data and the received reference positioning data on previously stored analysis data as new analysis data;
    transmitting an analysis result based on analysis of the new analysis data by the arithmetic processor;
    determining, at the positioning target location, whether the analysis result is good or poor; and
    continuing to acquire terminal positioning data from a satellite and transmitting the terminal positioning data for the predetermined time period to the arithmetic processor until the received analysis result is determined as good.

6. The positioning method according to claim 5, wherein when receiving no terminal positioning data within the predetermined time period and receiving the terminal positioning data thereafter, storing the terminal positioning data as new analysis data in place of the previously stored analysis data, analyzing the new analysis data, and transmitting the analysis result.

7. A positioning method for determining a positioning target location by continuously acquiring terminal positioning data for a predetermined time period at the positioning target location, the positioning method comprising:

acquiring terminal positioning data and reference positioning data corresponding to the terminal positioning data for the predetermined time period from a satellite at the positioning target location;

transmitting the terminal positioning data and the reference positioning data to an arithmetic processor;

upon receiving the terminal positioning data and the reference positioning data by the arithmetic processor, accumulating the received terminal positioning data and the received reference positioning data on previously stored analysis data as new analysis data;

transmitting an analysis result based on analysis of the new analysis data by the arithmetic processor;

determining whether the analysis result is good or poor; and continuing to acquire terminal positioning data from a satellite and transmitting the terminal positioning data for the predetermined time period to the arithmetic processor until the received analysis result is determined as good; and wherein when movement in the positioning target location is detected, canceling the positioning method regardless of a result of the received analysis result.

8. The positioning method according to claim 5, wherein after an elapse of the predetermined time period from when the positioning method is started, cancelling the positioning method regardless of the received analysis result.

9. The positioning system according to claim 1, further comprising: a communication unit for transmitting the terminal positioning data from the receiving terminal to the arithmetic processor, the reference positioning data from the reference station to the arithmetic processor, and the analysis result from the arithmetic processor to the receiving terminal.

* * * * *